(12) United States Patent
Ohshita et al.

(10) Patent No.: US 7,160,646 B2
(45) Date of Patent: *Jan. 9, 2007

(54) ELECTRODE FOR LITHIUM SECONDARY BATTERY AND LITHIUM SECONDARY BATTERY

(75) Inventors: Ryuji Ohshita, Tokushima (JP); Taeko Ota, Osaka (JP); Maruo Kamino, Kobe (JP); Hisaki Tarui, Kobe (JP); Masahisa Fujimoto, Osaka (JP); Shin Fujitani, Kobe (JP); Katsunobu Sayama, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 244 days.

This patent is subject to a terminal disclaimer.

(21) Appl. No.: 10/398,934

(22) PCT Filed: Mar. 4, 2002

(86) PCT No.: PCT/JP02/01943

§ 371 (c)(1),
(2), (4) Date: Apr. 11, 2003

(87) PCT Pub. No.: WO02/071512

PCT Pub. Date: Sep. 12, 2002

(65) Prior Publication Data

US 2004/0023111 A1    Feb. 5, 2004

(30) Foreign Application Priority Data

Mar. 6, 2001  (JP) .............................. 2001-061805
Apr. 18, 2001  (JP) .............................. 2001-119094
Jan. 31, 2002  (JP) .............................. 2002-023369

(51) Int. Cl.
*H01M 4/58* (2006.01)
*H01M 4/66* (2006.01)

(52) U.S. Cl. .............................. 429/218.1; 429/231.95; 429/245

(58) Field of Classification Search ............. 429/218.1, 429/231.95, 245
See application file for complete search history.

(56) References Cited

U.S. PATENT DOCUMENTS

| 5,631,100 | A  | * | 5/1997  | Yoshino et al. ..... 429/231.95 X |
| 6,235,427 | B1 | * | 5/2001  | Idota et al. ............... 429/218.1 |
| 6,432,585 | B1 | * | 8/2002  | Kawakami et al. ......... 429/233 |
| 6,576,366 | B1 | * | 6/2003  | Fujiwara et al. ......... 429/218.1 |
| 6,800,400 | B1 | * | 10/2004 | Ota et al. ........... 429/231.95 X |

FOREIGN PATENT DOCUMENTS

| JP | 6-260168 A  | 9/1994 |
| JP | 10-162823 A | 6/1998 |

(Continued)

OTHER PUBLICATIONS

Bourderau et al. "Amorphous silicon as a possible anode material for Li-ion batteries", Journal of Power Sources vol. 81-81, pp. 233-236. (1999, month unknown).*

*Primary Examiner*—Stephen J. Kalafut
(74) *Attorney, Agent, or Firm*—Kubovcik & Kubovcik

(57) ABSTRACT

An electrode for lithium secondary battery having a current collector and, deposited thereon, a thin film comprising silicon as a main component, characterized in that the thin film comprising silicon contains at least one of the elements belonging to the groups IIIa, Iva, Va, VIa, VIIa, VIII, Ib and IIb in the fourth, fifth and sixth periods of the Periodic Table (exclusive of copper (Cu)) at least in the surface portion thereof.

22 Claims, 2 Drawing Sheets

FOREIGN PATENT DOCUMENTS

| | | |
|---|---|---|
| JP | 10-199524 A | 7/1998 |
| JP | 10-223221 A | 8/1998 |
| JP | 11-135115 A | 5/1999 |
| JP | 2000-012088 A | 1/2000 |
| JP | 2000-243389 A | 9/2000 |
| WO | 00/33401 A1 | 6/2000 |

* cited by examiner

ELECTRODE FOR LITHIUM SECONDARY BATTERY AND LITHIUM SECONDARY BATTERY

BACKGROUND OF THE INVENTION

1. Field of the Invention

The present invention relates to an electrode for lithium secondary battery and lithium secondary battery using this.

2. Related Art

In recent years, development in lithium secondary batteries has been conducted enthusiastically. As for the lithium secondary battery, its battery characteristics such as charge-discharge voltage, charge-discharge cycle life characteristic and storage characteristic are greatly influenced by electrode active materials to be used.

In the electrode active materials capable of lithium storage and release, silicon is variously examined, since silicon can store lithium by being alloyed with lithium so that its theoretical capacity is large. However, since silicon is alloyed with lithium to store, volume expansion and shrinkage during charge-discharge reaction are large. For this reason, the active material is pulverized and separated from a current collector, so that the charge-discharge cycle characteristics are not good and thus silicon is not put into practical use.

In order to solve the above problem, silicon as the active material is attempted to be improved by doping impurity into silicon (Japanese Patent Laid-Open No. 10-199524 (1998)), and by using alloy powder of silicon and a different element (Japanese Patent Laid-Open No. 2000-243389), but sufficient results are not yet obtained.

In addition, there suggests a method of using an intermetallic compound of an element such as silicon and a metal or metalloid as a negative electrode active material so as to improve the cycle characteristic (Japanese Patent Laid-Open No. 10-223221 (1998)). However, a capacity retention rate is improved by making silicon into an intermetallic compound, but the discharge capacity after cycles is not substantially improved. The cause of this is such that since specified stoichiometry exists in an intermetallic compound, a quantity of element for absorbing and discharging lithium in unit volume becomes less, and an initial discharge capacity is reduced more greatly than the case where the element is used in element unit. For example, in the case of an $Si_3M$ structure (M: metal or metalloid), a concentration of Si atom for absorbing and discharging lithium is about 75 atomic % of the case of an Si element, and the concentration is reduced to about 67 atomic % in the case of an $Si_2M$ structure.

Meanwhile, as an electrode which can solve these problems, the applicants of this invention find an electrode which is formed by depositing a silicon thin film on a current collector according to a thin film forming method such as a CVD method or a sputtering method. It is confirmed that such a kind of the electrode shows high charge-discharge capacity and excellent charge-discharge cycle characteristics.

SUMMARY OF THE INVENTION

It is an object of the present invention to provide an electrode for lithium secondary battery, which is formed by depositing a silicon thin film on a current collector, and a lithium secondary battery using the electrode which are capable of improving charge-discharge cycle characteristics.

The present invention is an electrode for lithium secondary battery formed by depositing a thin film having silicon as a main component on a current collector, characterized in that the thin film having silicon as a main component contains at least one of elements belonging to groups IIIa, IVa, Va, VIa, VIIa, VIII, Ib and IIb in fourth, fifth and sixth periods of Periodic Table (exclusive of copper (Cu)) at least in a surface portion thereof.

Examples of the above element is concretely scandium (Sc), titanium (Ti), vanadium (V), chromium (Cr), manganese (Mn), iron (Fe), cobalt (Co), nickel (Ni), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), lanthanide series element, hafnium (Hf), tantalum (Ta), tungsten (W), rhenium (Re), osmium (Os), iridium (Ir), platinum (Pt), gold (Au) and hydrargyrum (Hg).

Examples of the above lanthanide series element are lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb) and lutetium (Lu).

In the above elements, elements belonging to particularly groups VIII, Ib and IIb are preferable because their diffusion factor in silicon is high. More concretely, these elements are iron, cobalt, nickel, zinc, ruthenium, rhodium, palladium, silver, cadmium, osmium, iridium, platinum, gold and hydrargyrum.

It is preferable that at least one element selected particularly from cobalt, zinc, iron, zirconium, nickel, silver and manganese is used. It is preferable that in them, at least one electrode selected particularly from cobalt, zinc, iron, zirconium and nickel is used.

In the present invention, at least the surface of the thin film comprising silicon as a main component contains the above elements. It is considered that reaction between the thin film surface and the electrolyte can be suppressed by containing the elements in the surface portion.

In addition, the entire thin film may contain the above elements. It is considered that expansion and contraction of the thin film due to charge-discharge reaction can be reduced by containing the elements in the thin film. Moreover, it is considered that mechanical properties of the thin film are changed by including the above elements in the thin film and the pulverization of the thin film can be suppressed. Further, since the expansion and contraction of the thin film can be reduced, a stress which is exerted upon the current collector from the thin film at the time of charge and discharge can be reduced, so that it is considered that generation of wrinkles on the current collector can be suppressed. The volume capacity density at the time of assembling a battery can be improved by suppressing the generation of wrinkles on the current collector.

In addition, densifying of the thin film occurs by including the above elements in the thin film. For this reason, reduction of percentage of an amount of the active material elements per unit volume is suppressed even if the above elements are contained in the thin film. Moreover, in the case where an amount of the elements to be contained is within a specified range, an amount of the active material element per unit volume is maintained equivalently or increased. At this time, a discharge capacity per unit volume can obtain the equivalent or larger value.

In the present invention, it is preferable that the above element and silicon form a solid solution in the thin film. For example in the case where the element is cobalt, it is preferable that not an intermetallic compound of silicon and cobalt but the solid solution of silicon and cobalt is formed and the cobalt is contained in the state of the solid solution.

In addition, it is preferable that the solid solution is in a non-equilibrium state. In the equilibrium state, only germanium which forms the solid solution together with silicon is known, and the solid solution of the above element and silicon exists only in the non-equilibrium state.

For example in the case where the element is cobalt, according to a binary state diagram of silicon and cobalt, silicon and cobalt form various kinds of intermetallic compounds in a wide rage of abundance ratio. However, the solid solution is not formed in the wide range of abundance ratio, and only a possibility that the solid solution is formed only in a range where a slight amount of any one of them is contained is discovered. Here, the intermetallic compound is a compound which has a specified crystal structure in which metals are combined with a specified ratio. Since the binary state diagram is based on the equilibrium state, a judgment cannot be made by the binary state diagram as to whether the non-equilibrium solid solution is formed. It is considered that since the solid solution is the non-equilibrium solid solution, the thin film structure is not broken even by charge-discharge reaction and lithium can be absorbed and released.

It is preferable that a content of the above element in the thin film is not more than 30 weight %, and more preferably not more than 20 weight %. When the content of the element in the thin film becomes too large, this is not preferable because the charge-discharge capacity of the thin film is lowered. Moreover, it is preferable that the content of the element in the thin film is not less than 0.1 weight %, and more preferably not less than 1 weight %. When the content of the element is too small, an effect of the invention which suppresses a reaction with an electrolyte and improves the charge-discharge cycle characteristics cannot be occasionally obtained sufficiently. Therefore, it is preferable that the content of the element is 0.1 to 30 weight %, and more preferably 1 to 20 weight %.

It is preferable that the content of the element in the thin film is not more than 17 atomic %. The reason for this is not clear, but it is considered that when the content of the element in the thin film is too large, aggregation of the element easily occurs, and this easily causes the pulverization of the active material layer, and thus the effect for improving the cycle characteristics is reduced.

It is preferable that the thin film of the present invention is separated into columns by gaps formed in its thickness direction as illustrated in FIG. 3. Since gaps exist around the columnar portions, and the gaps absorb a stress generated by expansion and contraction of the thin film during the charge-discharge cycles, and the generation of a stress for falling off the thin film from the current collector can be suppressed. Therefore, an adhesion state of a bottom portion of the columnar portion and the current collector can be maintained satisfactorily.

In addition, it is preferable that at least a not less than half portion of the thickness of the thin film is separated into the columns by the gaps in the thickness direction of the thin film.

Further, in the case where an uneven portion is formed on the surface of the thin film and the gaps, in which a recessed portion of the uneven portion is its end, is formed on the thin film, the gaps may be formed so that the columnar portion includes at least one convex portion on the thin film surface. In this case, the gaps may be formed so that the columnar portion includes a plurality of convex portions.

The gaps formed on the thin film may be formed by charge and discharge after initial charge and discharge. In this case, for example, the uneven portion is formed on the surface of the thin film before charge and discharge, and the gaps, in which a recessed portion of the uneven portion on the surface of the thin film is its end, is formed by charge and discharge after initial charge and discharge, and these gaps may separate the thin film into the columns.

The uneven portion on the surface of the thin film may be formed correspondingly to an uneven portion on the surface of the current collector as a ground layer. Namely, the current collector having the uneven portion on its surface is used and the thin film is formed thereon, so that the uneven portion can be provided on the surface of the thin film.

It is preferable that surface roughness Ra of the current collector is not less than 0.01 µm, more preferably 0.01 to 1 µm, and more preferably 0.05 to 0.5 µm. The surface roughness Ra is determined by Japanese Industrial Standard (JIS B 0601-1994), and it can be measured by, for example, a surface roughness meter.

In the present invention, it is preferable that the surface roughness Ra of the current collector has a relationship of Ra≦t with respect to a thickness t of the active material thin film. Moreover, it is preferable that the surface roughness Ra of the current collector and the mean spacing S of local peaks of profile satisfy the relationship of 100Ra≧S. The mean spacing S of local peaks of profile is determined by the Japanese Industrial Standard (JIS B 0601-1994), and it can be measured by, for example, a surface roughness meter.

The shape of the convex portion of the uneven portion on the surface of the current collector is not particularly limited, but is preferably cone shape, for example.

In addition, it is preferable that an upper portion of the columnar portion has a round shape in order to avoid concentration of an electric current due to the charge-discharge reaction.

In the present invention, the gaps in the thickness direction formed on the thin film may be formed by charge and discharge after initial charge and discharge, or previously formed before charge and discharge. As a method of previously forming such gaps on the thin film before charge and discharge, a method or the like of allowing the thin film of the electrode to absorb and release lithium or the like before assembling a battery is used, so that the volume of the thin film is expanded and contracted and the gaps can be formed. Needless to say, in the case where an active material which does not contain lithium is used as the positive electrode, a battery may be assembled in a state that the thin film absorbs lithium. Moreover, a resist film or the like which is patterned by photolithography is used and the thin film is formed into columns so that the thin film which is separated into columns by the gaps may be obtained.

Generally silicon is roughly classified into amorphous silicon, microcrystalline silicon, polycrystalline silicon and single crystalline silicon according to a difference in crystallinity. A peak of the amorphous silicon in the vicinity of 520 cm$^{-1}$ corresponding to the crystalline region in the Raman spectroscopy analysis is not substantially detected. As for the microcrystalline silicon, both a peak in the vicinity of 520 cm$^{-1}$ corresponding to the crystalline region and a peak in the vicinity of 480 cm$^{-1}$ corresponding to the amorphous region are substantially detected by the Raman spectroscopy analysis. Therefore, the microcrystalline silicon is substantially structured by the crystalline region and the amorphous region. As for the polycrystalline silicon and single crystalline silicon, their peaks in the vicinity of 480 cm$^{-1}$ corresponding to the amorphous region are not substantially detected by the Raman spectroscopy analysis.

In the present invention, a microcrystalline silicon thin film and an amorphous silicon thin film are preferable as the silicon thin film containing the above element.

Further, as the thin film containing silicon of the present invention, besides the above silicon thin films, a silicon-germanium alloy thin film can be used. As the silicon-germanium alloy thin film, a microcrystalline silicon-germanium alloy thin film and an amorphous silicon germanium thin film are preferably used. Microcrystalline and amorphous of the silicon-germanium alloy thin film can be determined similarly to the above silicon thin films. Since silicon and germanium can be mixed with each other to produce a uniform solid solution and each of them provides good results in the present invention, it is considered that silicon-germanium alloy which is alloy of them also provides good results.

In the present invention, the method of forming the thin film on the current collector is not particularly limited, but for example, a CVD method, a sputtering method, a vacuum evaporation method, a spraying method or a plating method can be used. In these thin film forming methods, the CVD method, the sputtering method and the vacuum evaporation method are preferably used.

A method of containing the above element in the thin film, for example in the case of the CVD method, a method of mixing a source gas containing the above element with a source gas of silicon and dissolving the mixed gas so as to form the thin film can be used. Moreover, in the case of the sputtering method, a method of arranging a target of silicon and a target of the above element so as to form the thin film can be used. In the case of the vacuum evaporation method, a method of arranging a vacuum evaporation source of silicon and a vacuum evaporation source of the above element so as to form the thin film can be used.

The current collector used in the present invention is not particularly limited as long as the thin film can be formed on it with satisfactory adhesion. As a concrete example of the current collector, at least one of the current collectors selected from copper, nickel, stainless steel, molybdenum, tungsten and tantalum can be used.

It is preferable that the current collector has a thin thickness and is made of a metal foil. It is preferable that the current collector is formed by a material which is not alloyed with lithium, and a particularly preferable material is copper. It is preferable that the current collector is made of a copper foil whose surface is roughed. Such copper foil is electrolytic copper foil. The electrolytic copper foil is obtained, for example, in such a manner that a metallic drum is dipped in an electrolyte in which copper ion is dissolved and while the drum is being rotated, an electric current is allowed to flow so that copper is separated out on the surface of the drum and is peeled. One surface or both surfaces of the electrolytic copper foil may be subject to a roughing treatment or a surface treatment.

In addition, copper is deposited on a surface of rolled copper foil by the electrolytic method so that copper foil with roughed surface may be obtained.

Further, an intermediate layer is formed on the current collector and the thin film may be formed on the intermediate layer. In this case, it is preferable that the intermediate layer contains a component which is easily diffused in the thin film, and for example, a copper layer is preferable. For example, the current collector in which the copper layer is formed on a nickel foil (electrolytic nickel foil or the like) with a roughed surface may be used. Moreover, a nickel foil which is roughed by depositing copper on the nickel foil using the electrolytic method may be used.

The gaps formed on the thin film in the present invention may be formed along low-density regions previously formed to extend in the thickness direction in the thin film. Such low-density regions are formed, for example, so as to extend upward from the recessed portion of the uneven portion on the surface of the current collector.

In the present invention, it is preferable that a component of the current collector is diffused in the thin film. Such diffusion of the current collector component into the thin film makes it possible to heighten the adhesion between the current collector and the thin film. Moreover, in the case where an element such as copper which is not alloyed with lithium is diffused as the current collector component, since alloying with lithium is suppressed in the diffused region, expansion and contraction of the thin film due to charge-discharge reaction can be suppressed, so that generation of stress which causes falling-off of the active material thin film from the current collector can be suppressed.

In addition, it is preferable that the concentration of the current collector component diffused in the thin film is high in the vicinity of the current collector, and the concentration is reduced as getting near to the surface of the thin film. When the thin film has such a concentration gradient of the current collector component, suppression of expansion and contraction due to the charge-discharge reaction exerts upon the vicinity of the current collector more strongly, so that generation of the stress which causes falling-off of the active material thin film in the vicinity of the current collector can be easily suppressed. Moreover, the concentration of the current collector component is reduced as getting near to the thin film surface, so that high charge-discharge capacity can be maintained.

Further, it is preferable the diffused current collector component does not form an intermetallic compound with the thin film component in the thin film but forms a solid solution. Here, the intermetallic compound has a specified crystal structure in which metals are combined with a specified ratio. When the thin film component and the current collector component do not form the intermetallic compound but form the solid solution in the thin film, the adhesion between the thin film and the current collector becomes satisfactory, so that higher charge-discharge capacity can be obtained.

An impurity other than the above element may be doped in the thin film of the present invention. Examples of such an impurity are elements such as phosphorus, aluminum, arsenic, antimony, boron, gallium, indium, oxygen and nitrogen.

In addition, the thin film of the present invention may be formed by laminating a plurality of layers. In the respective laminate layers, composition, crystallinity, concentration and the like of the element and impurity may differ. Moreover, the thin film may have a gradient structure in the thickness direction. For example, the gradient structure can be such that composition, crystallinity, concentration and the like of the element and impurity are changed in the thickness direction.

In addition, lithium may be previously absorbed by or added into the thin film of the present invention. Lithium may be added when the thin film is formed. Namely, the thin film containing lithium is formed, so that lithium may be added to the thin film. Moreover, after the thin film is formed, lithium may be absorbed by or added to the thin film. As a method of allowing lithium to absorb or be added, a method of allowing lithium to absorb or be added electrochemically can be used.

Further, the thickness of the thin film of the present invention is not particularly limited, but the thickness can be, for example, not more than 20 μm. Moreover, in order to obtain high charge-discharge capacity, it is preferable that the thickness is not less than 1 μm.

A lithium secondary battery of the present invention is characterized by including a negative electrode composed of the above electrode of the present invention, a positive electrode and a nonaqueous electrolyte.

An electrolyte solvent used for the lithium secondary battery of the present invention is not particularly limited, but its example is a mixed solvent of cyclic carbonate such as ethylene carbonate, propylene carbonate, butylene carbonate or vinylene carbonate and chain carbonate such as dimethyl carbonate, methylethyl carbonate or diethyl carbonate. Moreover, an example of the electrolyte solvent is a mixed solvent of the above cyclic carbonate and an ether solvent such as 1,2-dimethoxyethane or 1,2-diethoxyethane or a chain ester such as γ-butyrolactone, sulfolane or methyl acetate. Moreover, examples of electrolyte solute are $LiPF_6$, $LiBF_4$, $LiCF_3SO_3$, $LiN\,(CF_3SO_2)_2$, $LiN\,(C_2F_5SO_2)_2$, $LiN\,(CF_3SO_2)\,(C_4F_9SO_2)$, $LiC\,(CF_3SO_2)_3$, $LiC\,(C_2F_5SO_2)_3$, $LiAsF_6$, $LiClO_4$, $Li_2B_{10}Cl_{10}$, $Li_2B_{12}Cl_{12}$ and the like and their mixture. Further, examples of electrolyte are a gel type polymer electrolyte, in which polymer electrolyte such as polyethylene oxide, polyacrylonitrile or polyvinylidene fluoride is impregnated into an electrolyte solution, and inorganic solid electrolyte such as LiI, $Li_3N$. The electrolyte of the lithium secondary battery of the present invention can be used without restriction as long as a Li compound imparting an ionic conductivity and a solvent for dissolving and retaining the Li compound are not decomposed at voltages during charge discharge and storage of the battery.

Examples of the positive electrode active material of the lithium secondary battery of the present invention are lithium-containing transition metal oxides such as $LiCoO_2$, $LiNiO_2$, $LiMn_2O_4$, $LiMnO_2$, $LiCo_{0.5}Ni_{0.5}O_2$ or $LiNi_{0.7}Co_{0.2}Mn_{0.1}O_2$ and metal oxides which do not contain lithium such as $MnO_2$. Moreover, besides them, any materials where lithium is inserted into and separated from electrochemically can be used without restriction.

A lithium secondary battery of another aspect of the present invention is characterized by including a positive electrode composed of the above electrode of the present invention, a negative electrode and a nonaqueous electrolyte.

As the nonaqueous electrolyte, similar one to the above nonaqueous electrolyte can be used.

As the negative electrode, for example, lithium metal, bismuth-lithium alloy, antimony-lithium alloy or the like can be used.

DESCRIPTION OF THE PREFERRED EMBODIMENTS

Figure 1:
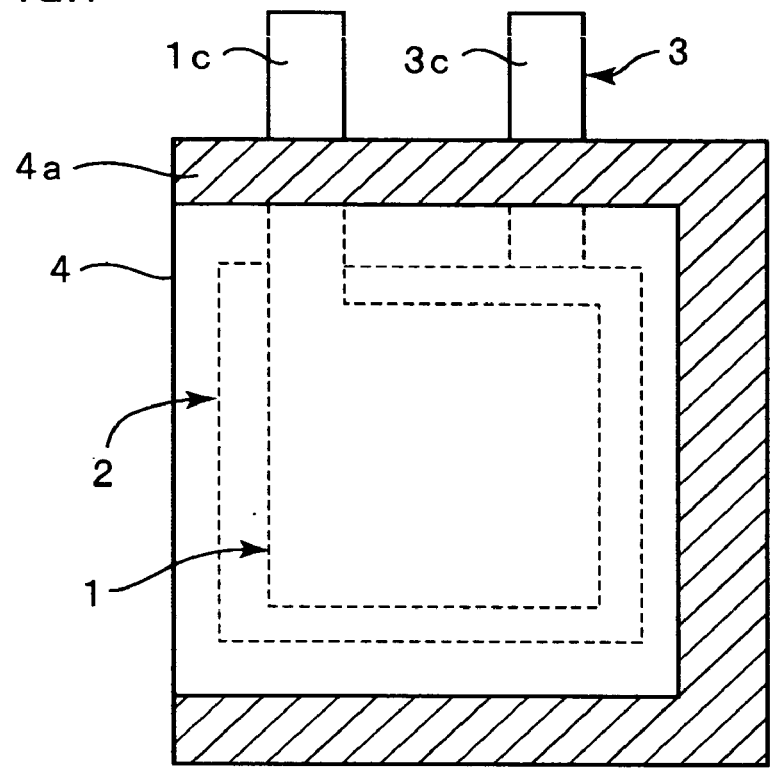
FIG. 1 is a plan view showing a lithium secondary battery manufactured in an embodiment of the present invention.

There will be further detailed below the present invention based on embodiments but the present invention is not limited to the following embodiments and the invention is suitably modified so as to be carried out without departing from the gist of the invention.

(Experiment 1)
[Manufacturing of Negative Electrode]

Electrolytic copper foil (thickness: 18 μm, surface roughness: Ra=0.188 μm) was used as a current collector, and a thin film was formed on the electrolytic copper foil by an RF sputtering method. As the thin film, a silicon-cobalt thin film, a silicon-chromium thin film and a silicon thin film were formed. As the silicon-cobalt thin film, five kinds of thin films in which their cobalt content are different from one another were formed.

The sputtering conditions were such that sputter gas (Ar) flow rate: 10 sccm, a substrate temperature: room temperature (without heating), reactive pressure: 0.665 Pa ($5\times10^{-3}$ Torr) and a high frequency power: 500 W. A single crystalline silicon target (diameter: 4 in (100 mm)) was used as a target, and as for fabricating samples which contain cobalt as a different element, cobalt (Co) chips were arranged on the silicon (Si) target, and as for fabricating samples which contain chromium as a different element, chromium (Cr) chips were arranged on the silicon target. The thin films were formed on the electrolytic copper foil of 100 mm×100 mm so that their thickness became about 5 μm.

When the obtained thin films were subjected to Raman spectroscopy analysis, a peak in the vicinity of 480 $cm^{-1}$ was detected but a peak in the vicinity of 520 $cm^{-1}$ was not detected. As a result, it was found that the obtained thin films were thin films comprising amorphous silicon as a main component. Moreover, as for the thin films containing cobalt or chromium, the content of respective elements was determined by X-ray fluorescence analysis. The content of different elements in the respective thin films and the arrangement state of the chips in the target at the time of sputtering are shown in Table 1.

TABLE 1

| Different Element | | |
|---|---|---|
| Type | Content | Arrangement State of Chip |
| Co | 1 weight % | Arrange one Co chip of 1 mm × 1 mm on Si target. |
| Co | 5 weight % | Arrange one Co chip of 5 mm × 5 mm on Si target. |
| Co | 10 weight % | Arrange one Co chip of 10 mm × 10 mm on Si target. |
| Co | 20 weight % | Arrange four Co chips of 5 mm × 5 mm on Si target. |
| Co | 40 weight % | Arrange four Co chips of 10 mm × 10 mm on Si target. |
| Cr | 5 weight % | Arrange four Cr chips of 10 mm × 10 mm on Si target. |

When the content of Co in the thin films shown in Table 1 is converted into atomic %, 1 weight %, 5 weight %, 10 weight %, 20 weight % and 40 weight % are converted into 0.5 atomic %, 2 atomic %, 5 atomic %, 11 atomic % and 24 atomic %, respectively. Further, 5 weight % of Cr is 3 atomic %.

The electrolytic copper foils on which the thin films were formed were cut out into 2.5 cm×2.5 cm, and they were dried at 100° C. for 2 hours in a vacuum. An electrode which contained 1 weight % of cobalt was A1, an electrode which contained 5 weight % of cobalt was A2, an electrode which contained 10 weight % of cobalt was A3, an electrode which contained 20 weight % of cobalt was A4, an electrode which contained 40 weight % of cobalt was A5, an electrode which contained 5 weight % of chromium was B1, an electrode which was made of the amorphous silicon thin film uncontaining a different element was X1. These electrodes were used as a negative electrode when the following batteries were manufactured.

[Manufacturing of Positive Electrode]

85 weight % of LiCoO$_2$ powder having an average particle diameter of 10 μm, 10 weight % of carbon powder as an electrically conductive agent and 5 weight % of polyvinylidene fluoride powder as a binding agent were mixed, and N-methyl pyrolidone was added to the obtained mixture and kneaded so that slurry was manufactured. The slurry was applied to one surface of the current collector made of aluminum foil with a thickness of 20 μm by a doctor blade method. This current collector was dried at 100° C. for two hours in a vacuum and was cut out into 2.0 cm×2.0 cm so as to be a positive electrode.

[Preparation of Electrolyte]

1 mol/l of LiPF$_6$ was dissolved in a solvent obtained by mixing ethylene carbonate and diethyl carbonate with a volume ratio of 3:7 so that electrolyte was prepared.

[Manufacturing of Battery]

The above positive electrode and the above negative electrode were laminated with a polyethylene fine porous film in between in a glove box in an atmosphere of argon gas, and this was inserted into a case body made of an aluminum laminate material. 500 μl of the electrolyte was poured into this case body so that a lithium secondary battery was manufactured. A design capacity of the battery is 14 mAh.

FIG. 1 is a plan view showing the manufactured lithium secondary battery. As shown in FIG. 1, the positive electrode 1 and the negative electrode 3 are combined with a separator 2 made of a polyethylene fine porous film in between and they are inserted into the case body 4. After inserting into the case body 4, the electrolyte is poured and a sealing portion 4a of the case body 4 is sealed so that the lithium secondary battery is manufactured.

Figure 2:
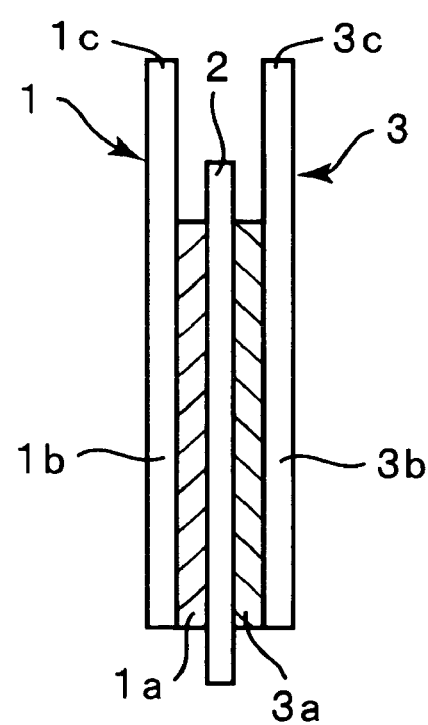
FIG. 2 is a cross sectional view showing a structure where electrodes are combined in the lithium secondary battery shown in FIG. 1.
Figure 3:
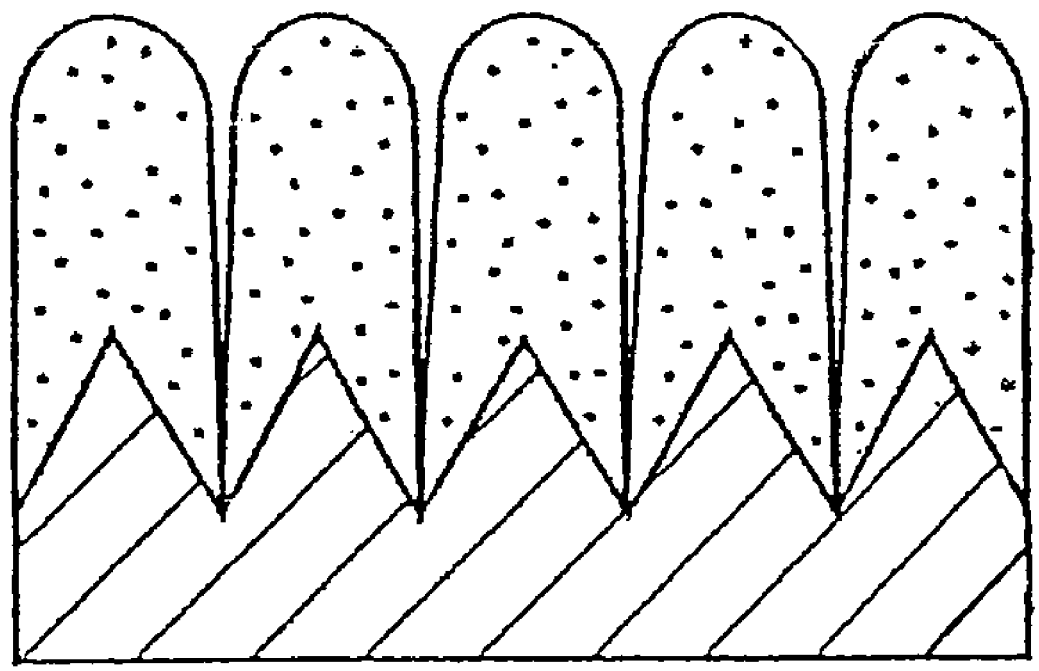
FIG. 3 is a schematic sectional view showing a thin film of an electrode of an embodiment of the present invention deposited on a current collector and divided into columns by gaps formed in its thickness direction.

FIG. 2 is a cross sectional view showing a battery combined state in the battery. As shown in FIG. 2, the positive electrode 1 and the negative electrode 3 are combined with the separator 2 in between so as to be opposed to each other. In the positive electrode 1, a positive electrode active material layer 1a is provided onto a positive electrode current collector 1b made of aluminum and the positive electrode active material layer 1a comes in contact with the separator 2. Moreover, in the negative electrode 3, a negative electrode active material layer 3a is provided onto a negative electrode current collector 3b made of copper and the negative electrode active material layer 3a comes in contact with the separator 2.

As shown in FIG. 2, a positive electrode tab 1c made of aluminum for taking out is attached to the positive electrode current collector 1b. Moreover, a negative electrode tab 3c made of nickel for taking out is attached also to the negative electrode current collector 3b.

[Measurement of Charge-discharge Cycle Characteristics]

The charge-discharge cycle characteristics of the above batteries were evaluated. Charge was carried out up to 4.20 V by a constant current of 14 mA, and constant voltage charge with cycle of 4.20 V was carried out up to 0.7 mA. The discharge was carried out up to 2.75 V by the constant current of 14 mA, and this procedure was one cycle. The capacity retention rate after 90 cycles was obtained by the following equation. The result is shown in Table 2. Here, the measurement was conducted at 25° C.

Capacity retention rate (%)=(discharge capacity at 90th cycle/discharge capacity at first cycle)×100

In addition, Table 2 shows the results of X-ray diffraction analysis (XRD: X-ray source: CuKα) of the thin films formed as the respective electrodes.

TABLE 2

| Electrode | Different Element Type | Different Element Content | Discharge Capacity at 1st Cycle (mAh) | Discharge Capacity at 90th Cycle (mAh) | Capacity Retention Rate (%) | XRD Result |
|---|---|---|---|---|---|---|
| A1 | Co | 1 weight % | 13.5 | 6.8 | 50 | No Peak in Si—Co Compound |
| A2 | Co | 5 weight % | 13.6 | 9.9 | 73 | No Peak in Si—Co Compound |
| A3 | Co | 10 weight % | 13.7 | 11.8 | 86 | No Peak in Si—Co Compound |
| A4 | Co | 20 weight % | 13.6 | 11.4 | 84 | No Peak in Si—Co Compound |
| A5 | Co | 40 weight % | 4.9 | 0 | 0 | Peak Exists in Si—Co Compound |
| B1 | Cr | 5 weight % | 13.4 | 5.6 | 42 | No Peak in Si—Co Compound |
| X1 | — | 0 | 13.4 | 3.5 | 26 | — |

As is clear from Table 2, in the batteries using the electrodes A1 through A4 containing 1 to 20 weight % of cobalt and the battery using the electrode B1 containing 5 weight % of chromium, the capacity retention rate is higher than that of the battery using the electrode X1 made of the amorphous silicon thin film uncontaining a different element, and thus it is found that the charge-discharge cycle characteristics are improved.

In the electrode A5, as the result of the X-ray diffraction analysis, the peak of the intermetallic compound of silicon and cobalt is found on the thin film. On the contrary, on the electrodes A1 through A4, the peak of intermetallic compound is not found, and thus it is found that the cobalt and the silicon form a solid solution in the thin film. Similarly in the electrode B1, it is found that the chromium and the silicon form a solid solution in the thin film.

(Experiment 2)

Similarly to the experiment 1, thin films were formed on the electrolytic copper foil by an RF sputtering method. As the thin film, a silicon-zinc thin film, a silicon-iron thin film, a silicon-nickel thin film, a silicon-zirconium thin film, a silicon-silver thin film, a silicon-manganese thin film, a silicon-molybdenum thin film, a silicon-tantalum thin film, a silicon-niobium thin film, a silicon-titanium thin film, a silicon-tungsten thin film and a silicon-vanadium thin film were formed.

As for a target, similarly to the experiment 1, the chips made of the above different elements were arranged on the single crystalline silicon target. The sizes and numbers of the chips are shown in Table 3.

The obtained thin films were subjected to the Raman spectroscopy analysis, so that it was confirmed that they were thin films comprising amorphous silicon as a main component.

Similarly to the experiment 1, the lithium secondary batteries were manufactured by using the electrolytic copper foils formed with the thin films, and similarly to the experiment 1 their charge-discharge cycle characteristics were evaluated. The results are shown in Table 3. Table 3 also shows the result of the lithium secondary battery using the comparative electrode X1 in the experiment 1.

TABLE 3

| Electrode | Different Element Type | Content (weight %) | Size (mm) and Number of Chips | Discharge Capacity at 1st Cycle (mAh) | Discharge Capacity at 90th Cycle (mAh) | Capacity Retention Rate (%) | XRD Result |
|---|---|---|---|---|---|---|---|
| C | Zn | 3 | 8 × 8 (4 pieces) | 13.8 | 11.6 | 84 | No Peak in Si—Zn Compound |
| D | Fe | 8 | 10 × 10 (1 piece) | 14.0 | 12.2 | 87 | No Peak in Si—Fe Compound |
| E | Ni | 7 | 5 × 5 (1 piece) | 14.0 | 11.3 | 82 | No Peak in Si—Ni Compound |
| F | Zr | 12 | 10 × 10 (2 pieces) | 13.6 | 11.1 | 84 | No Peak in Si—Zr Compound |
| G | Ag | 20 | 10 × 10 (1 piece) | 13.6 | 10.2 | 71 | No Peak in Si—Ag Compound |
| H | Mn | 10 | 10 × 10 (1 piece) | 13.6 | 8.8 | 65 | No Peak in Si—Mn Compound |
| I | Mo | 20 | 10 × 10 (2 pieces) | 11.9 | 5.8 | 49 | No Peak in Si—Mo Compound |
| J | Ta | 13 | 10 × 10 (2 pieces) | 10.6 | 4.4 | 37 | No Peak in Si—Ta Compound |
| K | Nb | 25 | 10 × 10 (3 pieces) | 13.3 | 3.4 | 39 | No Peak in Si—Nb Compound |
| L | Ti | 5 | 10 × 10 (2 pieces) | 14.0 | 2.3 | 27 | No Peak in Si—Ti Compound |
| M | W | 20 | 10 × 10 (2 pieces) | 12.6 | 3.1 | 27 | No Peak in Si—W Compound |
| N | V | 5 | 10 × 10 (1 piece) | 11.8 | 2.9 | 27 | No Peak in Si—V Compound |
| X1 | — | — | — | 13.4 | 3.5 | 26 | — |

As for the electrodes C through N shown in Table 3, a relationship between weight % and atomic % is shown in Table 4.

TABLE 4

| Electrode | Type | Content Weight % | Atomic % |
|---|---|---|---|
| C | Zn | 3 | 1 |
| D | Fe | 8 | 4 |
| E | Ni | 7 | 4 |
| F | Zr | 12 | 4 |
| G | Ag | 20 | 6 |
| H | Mn | 10 | 5 |
| I | Mo | 20 | 7 |
| J | Ta | 13 | 2 |
| K | Nb | 25 | 9 |
| L | Ti | 5 | 3 |
| M | W | 20 | 4 |
| N | V | 5 | 3 |

As is clear from Table 3, the batteries, which use the electrodes C through N using the amorphous silicon thin film containing different elements according to the present invention, have higher capacity retention rate than that of the battery which uses the electrode X1 of the amorphous silicon thin film uncontaining different elements, and thus it is found that the charge-discharge cycle characteristics are improved. In addition, as the result of the X-ray diffraction analysis, since the peak of the intermetallic compound of silicon and the different elements is not found on the thin film, it is found that the different elements and silicon form a solid solution in the thin films.

The electrodes G through H, which contain zinc, iron, nickel, zirconium, silver and manganese in the above different elements, show satisfactory capacity retention rate, and in them particularly zinc, iron, zirconium and nickel show satisfactory capacity retention rate of not less than 80%.

(Experiment 3)

The electrolytic copper foil (thickness: 18 μm, surface roughness: Ra=0.188 μm) was used as the current collector, and thin films were formed on the electrolytic copper foil by the sputtering method using DC pulse discharge. As the thin films, a silicon-cobalt thin film, a silicon-zinc thin film, a silicon-iron thin film and a silicon-zirconium thin film were formed.

The sputtering conditions were such that a sputter gas (AR) flow rate: 85 sccm, a substrate temperature: room temperature (without heating), reactive pressure: 0.532 Pa ($4\times10^{-3}$ Torr), a DC pulse frequency: 100 kHz, a pulse width: 1.696 μs and an applying power: 1300 W. The thin films were formed on the electrolytic copper foil of 175 mm×400 mm so that their thickness becomes about 6 μm.

As the target, silicon alloy targets of 35 cm×20 cm, which were obtained by mixing respective elements including cobalt, zinc, iron and zirconium with silicon and sintering them, were used. The type and concentration of the mixed elements in the respective targets and the concentration of the mixed elements in the obtained thin films are shown in Table 5. Here, the concentration of the elements in the thin films was measured by X-ray fluorescence analysis.

In addition, the obtained thin films were subjected to the Raman spectroscopy analysis, and it was confirmed that they were thin films comprising amorphous silicon as a main component.

The electrolytic copper foils on which the thin films were formed were used so that the lithium secondary batteries were manufactured similarly to the experiments 1 and 2, and the charge-discharge cycle characteristics were evaluated similarly to the experiments 1 and 2. The results are shown in Table 5. Here, as a comparison, a comparative electrode X2, which was formed with the amorphous silicon thin film using crystalline silicon as a target, was manufactured. The result of the lithium secondary battery using this comparative electrode X2 is also shown in Table 5.

TABLE 5

| Electrode | Type | Mixed Element Concentration in Target (weight %) | Concentration in Film (weight %) | Concentration in Film (atomic %) | Discharge Capacity at 1st Cycle (mAh) | Discharge Capacity 90th Cycle (mAh) | Capacity Retention Rate (%) | XRD Result |
|---|---|---|---|---|---|---|---|---|
| O | Co | 20 | 20 | 11 | 13.6 | 9.1 | 67 | No Peak in Si—Co Compound |
| P | Co | 30 | 30 | 17 | 12.5 | 9.0 | 72 | No Peak in Si—Co Compound |
| Q | Zn | 5 | 4 | 2 | 13.9 | 8.5 | 61 | No Peak in Si—Zn Compound |
| R | Fe | 10 | 10 | 5 | 13.4 | 10.3 | 77 | No Peak in Si—Fe Compound |
| S | Zr | 10 | 11 | 4 | 13.7 | 9.2 | 67 | No Peak in Si—Zr Compound |
| X2 | — | — | — | — | 14.2 | 6.2 | 44 | — |

As is clear from Table 5, the batteries, which use the electrodes O through S using the amorphous silicon thin film containing the different elements according to the present invention, have higher capacity retention rate than that of the battery which uses the electrode X2 using the amorphous silicon thin film uncontaining the different element which is formed under the same conditions, and thus it is found that the charge-discharge cycle characteristics are improved. Moreover, as the result of the X-ray diffraction analysis, a peak of the intermetallic compounds of silicon and the different elements in the thin films was not found. Therefore, it is found that the different elements and silicon form a solid solution in the thin films.

The electrode O was taken out at the time of end of the fourth cycle, its SEM observation was conducted. As a result, gaps which extends up to a valleylike portion as an end of an uneven portion on the thin film surface were formed in a thickness direction of the entire thin film, and it was confirmed that the thin film was separated into columns by these gaps.

A weight of Si per unit area which is determined by the X-ray fluorescence analysis was normalized by a film thickness so that weight density of Si per unit volume was obtained. The weight density of the electrode X2 was 2.22 g/cm$^3$, whereas the weight density of the electrode O was 2.13 g/cm$^3$ although it contained 20 weight % (11 atomic %) of cobalt. This shows that even if cobalt is added, lowering of the weight density and the atomic density of Si is suppressed.

Further, as discharge capacity density per unit volume is larger within the range in which the satisfactory cycle characteristic is obtained, the active material layer with smaller area and thinner thickness can be available. For this reason, this is an important value for design of the batteries. Both the electrodes X2 and O had the discharge capacity density per unit volume of 6.8 Ah/cm$^3$. Namely, although the electrode O contains 20 weight % (11 atomic %) of cobalt, it can have the same level of the discharge capacity as that of the electrode X2. This and above-described result show the denseness of the active material thin film are improved in the electrode O.

In addition, the discharge capacity density of the electrode P per unit volume was 6.3 Ah/cm$^3$ and was slightly lowered in comparison with the electrode X2. However, the electrode P contains 30 weight % (17 atomic %) of cobalt, and when this is taken into consideration, the high value is obtained. Moreover, the capacity retention rate becomes higher, thereby improving the cycle characteristics greatly.

INDUSTRIAL APPLICABILITY

According to the present invention, an electrode for lithium secondary battery having high discharge capacity and excellent charge-discharge cycle characteristics can be obtained.

The invention claimed is:

1. An electrode for lithium secondary battery formed by depositing a thin film comprising silicon as a main component on a current collector, characterized in that said thin film comprising silicon as a main component contains at least one of the elements (exclusive of copper (Cu)) belonging to groups IIIa, IVa, Va, VIa, VIIa, VIII, Ib and IIb in fourth, fifth and sixth periods of Periodic Table at least in a surface portion thereof, and said thin film is divided into columns by gaps formed therein and extending in a thickness direction of said film from a surface of said film toward said current collector and said columnar portions are at their bottoms adhered to said current collector.

2. The electrode for lithium secondary battery according to claim 1, characterized in that said entire thin film contains said element.

3. The electrode for lithium secondary battery according to claim 1, characterized in that said element is contained in said thin film so as to form a solid solution with silicon.

4. The electrode for lithium secondary battery according to claim 3, characterized in that said solid solution is a non-equilibrium solid solution.

5. The electrode for lithium secondary battery according to claim 1, characterized in that a content of said element in said thin film is not more than 30 weight %.

6. The electrode for lithium secondary battery according to claim 1, characterized in that a content of said element in said thin film is not more than 17 atomic %.

7. The electrode for lithium secondary battery according to claim 1, characterized in that said thin film is formed by a CVD, sputtering, vacuum evaporation, spraying, or plating process.

8. The electrode for lithium secondary battery according to claim 1, characterized in that said thin film is an amorphous silicon thin film or a microcrystalline silicon thin film.

9. The electrode for lithium secondary battery according to claim 1, characterized in that atomic density of silicon per unit volume in said thin film is equivalent or increased by including said element in said thin film.

10. The electrode for lithium secondary battery according to claim 1, characterized in that a discharge capacity in said thin film per unit volume is equivalent or increased by including said element in said thin film.

11. The electrode for lithium secondary battery according to claim 1, characterized in that said element is cobalt or chromium.

12. The electrode for lithium secondary battery according to claim 1, characterized in that said element is at least one element selected from zinc, iron, zirconium and nickel.

13. The electrode for lithium secondary battery according to claim 1, characterized in that said gaps are formed along low-density regions which extend in the thickness direction of said thin film.

14. The electrode for lithium secondary battery according to claim 1, characterized in that said current collector is at least one current collector selected from copper, nickel, stainless steel, molybdenum, tungsten and tantalum.

15. The electrode for lithium secondary battery according to claim 1, characterized in that surface roughness Ra of said current collector is 0.01 to 1 μm.

16. The electrode for lithium secondary battery according to claim 1, characterized in that said current collector is a copper foil.

17. The electrode for lithium secondary battery according to claim 16, characterized in that both surfaces of said copper foil are roughed.

18. The electrode for lithium secondary battery according to claim 16, characterized in that said copper foil is an electrolytic copper foil.

19. The electrode for lithium secondary battery according to claim 1, characterized in that a component of said current collector is diffused in said thin film.

20. The electrode for lithium secondary battery according to claim 19, characterized in that the component of said current collector is diffused with concentration distribution in which the concentration becomes high in the vicinity of said current collector and the concentration becomes lower as further separating from said current collector.

21. A lithium secondary battery, characterized by comprising a negative electrode made of the electrode according to claim 1, a positive electrode and nonaqueous electrolyte.

22. A lithium secondary battery, characterized by comprising a positive electrode made of the electrode according to claim 1, a negative electrode and nonaqueous electrolyte.

* * * * *